Patented Dec. 13, 1938

2,140,041

UNITED STATES PATENT OFFICE 2,140,041

TANNING

John Arthur Wilson, Milwaukee, Wis., assignor to Hall Laboratories, Inc., Pittsburgh, Pa., a corporation of Pennsylvania No Drawing. Application May 17, 1937, Serial No. 143,120

43 Claims. (Cl. 149—5)

This invention relates to the manufacture of leather, and more particularly to the tanning of hides and skins with solutions of an alkali-metal phosphate or the corresponding acids.

This application is a continuation-in-part of my copending application Serial No. 84,478, filed June 10, 1936.

For convenience, I will refer mainly to the alkali-metal phosphates, it being understood that the corresponding acids may be employed. The preferred alkali-metal phosphate which I employ as a tanning agent is "Graham's salt", (Textbook of Inorganic Chemistry, edited by J. Newton Friend, vol. 6, part 2, page 177, by J. B. R. Prideaux, Philadelphia, 1934; Gmelin, Handbuch der Anorganischen Chemie, vol. 21, page 922, 8th edition, Berlin, 1928); or "Graham's metaphosphate" (A Dictionary of Chemistry, by Henry Watts, vol. 4, page 578, New York, 1873; A Treatise on Chemistry, by Roscoe & Schorlemmer, vol. 2, part 1, page 283, New York, 1923). Graham's metaphosphate or salt is believed to consist principally of sodium hexametaphosphate. The sodium hexametaphosphate is assumed to be a complex of the general formula $Na_2(Na_4P_6O_{18})$, although some authorities believe that salts of the formula $Na_5(NaP_6O_{18})$ and $Na_4(Na_2P_6O_{18})$ may also be present.

Solutions which are similar to solutions of Graham's salt may be made by dissolving water-insoluble Maddrell salts or Kurrol salts in acid solution, as described in the copending application of Casimir J. Munter, Serial No. 68,442, filed March 12, 1936. When I refer to "a solution of a glassy material containing the $PO_3$ radical," I intend to include not only a solution of Graham's salt, but also a solution of Kurrol, Maddrell and other water-insoluble alkali-metal phosphates rendered soluble by the addition of acid.

Graham's salt which consists principally of sodium hexametaphosphate, is a glassy (non-crystalline) sodium hexametaphosphate. Sodium trimetaphosphate, on the other hand, is a crystalline material and although having an appreciable tanning action, is considerably less effective than Graham's salt. In fact, the trimetaphosphate has only approximately one-third the tanning effect of Graham's salt. Another alkali-metal phosphate which exerts some tanning action but which is even less effective than crystalline sodium trimetaphosphate, is sodium tripolyphosphate, $(Na_5P_3O_{10})$. Sodium tripolyphosphate is a definite chemical compound distinct from sodium metaphosphate or sodium pyrophosphate and is not a mixture of the two. Sodium pyrophosphate has been found to have practically no tanning effect on animal skin.

The materials which I employ as tanning agents in accordance with the present invention have the general formula $(M_2O)_x.(P_2O_5)_y$, in which M is hydrogen, ammonium and/or an alkali-metal, and in which the molar ratio of $M_2O$ to $P_2O_5$ is less than 2:1. In this formula, where M is hydrogen, the material is an acid, and where M is an alkali-metal or ammonium, it is a phosphate. Sodium metaphosphate ($NaPO_3$), or sodium hexametaphosphate ($Na_6P_6O_{18}$) which is known as Graham's salt, have a molar ratio of $Na_2O$ to $P_2O_5$ of 1:1. Sodium tripolyphosphate ($Na_5P_3O_{10}$) has a molar ratio of $Na_2O$ to $P_2O_5$ of 5:3. Tetrasodium pyrophosphate ($Na_4P_2O_7$) has a molar ratio of $Na_2O$ to $P_2O_5$ of 2:1, and trisodium orthophosphate ($Na_3PO_4$) has a molar ratio of $Na_2O$ to $P_2O_5$ of 3:1. Neither the pyrophosphate nor the orthophosphate has an appreciable tanning action on animal skins and do not come within the scope of the present invention. The metaphosphates and tripolyphosphates may be regarded as salts of condensed or molecularly dehydrated phosphoric acids having a greater degree of molecular dehydration than pyrophosphoric acid.

I believe that the glassy alkali-metal phosphates have the general formula $(NaPO_3)_x$, in which $x$ is greater than 3, or $Na_3PO_4(NaPO_3)_x$, in which $x$ is greater than 1.

So far as I am aware, no one has ever before suspected that phosphates have tanning actions of their own, under any conditions. From my studies of atomic structure, and chemical combination, I reasoned that complex phosphates of sufficiently high molecular weight should exhibit marked tanning actions on animal hide, particularly when applied in acid solution, and that the rate or degree of tanning should increase as the pH value of the solution is lowered, by the addition of acid, to the point where the hide protein acquires a maximum positive electrical charge (about pH=2.4).

My theory was subjected to a number of series of tests which proved the correctness of the reasoning. In one series, 20 gram portions of hide powder were treated for 24 hours with 200 cc. portions of a solution of Graham salt containing phosphate equivalent to 1 mol $P_2O_5$ per liter. This solution had a pH value of 5.65. One portion was used without pH adjustment. To another portion, sodium hydroxide was added to raise the pH value to 8.10. To the others, increasing amounts of hydrochloric acid were added to produce a range of pH values down to 2.01. After tanning for 24 hours, the tanned powders were washed to remove uncombined Graham salt, dried and analyzed. The following table shows the amount of Graham salt, calculated as P₂O₅, combined with the protein as a function of pH value of the solution:

Table I

| pH value | | Grams P₂O₅ combined with 100 grams hide protein |
|---|---|---|
| Before tanning | After tanning | |
| 8.10 | 7.48 | 0.04 |
| 5.65 | 5.58 | 0.38 |
| 5.00 | 5.01 | 0.46 |
| 3.98 | 4.39 | 1.78 |
| 2.97 | 4.09 | 2.42 |
| 2.01 | 2.65 | 5.82 |

This work was followed by a series of practical demonstrations on cowhides, calfskins and goatskins. A typical example follows: After the usual beamhouse operations of soaking, fleshing, liming, unhairing, scudding, washing and bating, the stock was weighed and put into a drum. For each 100 pounds bated weight of stock, there was added 3.75 pounds Graham salt in 12 gallons water at 70° F. plus a sufficient amount of hydrochloric acid to reduce the initial pH value of the solution to 1.0. The bated stock causes the pH value to rise, but enough more acid was then added to bring the pH value of the solution to 2.4. The stock was run in this liquor, with occasional drumming, for 24 hours, after which the stock was washed and drained and then either fatliquored or swabbed with oil, glycerine, butyl carbitol or other suitable material and dried. The product was a white leather of great strength and durability.

I then conceived of a modification of the above procedure in order to make a soft, white, washable leather, having some marked advantages for special uses. In the above operation, along with the 3.75 pounds of Graham salt, there was added 25 pounds of 40% formaldehyde. After tanning for 24 hours in acid medium, alkali was added gradually to raise the pH value of the solution slowly to the range 8.0 to 9.0. The stock was then kept in the liquor over night, with occasional drumming. It was then washed, fat-liquored and dried. The product was a pure white, soft, washable leather.

The alkali-metal trimetaphosphates and tripolyphosphates exhibit some tanning action, but are not nearly as effective as Graham's salt. A comparison of the tanning action of these phosphates with Graham's salt is given in the following table. The tanning time was 24 hours and the pH value of the liquor 3.0.

Table II

| Phosphate used | Grams P₂O₅ combined with 100 grams hide protein |
|---|---|
| Sodium tripolyphosphate (Na₅P₃O₁₀) | 0.60 |
| Sodium trimetaphosphate (NaPO₃)₃ | 2.0 |
| Graham's salt | 5.81 |

Leather tanned in accordance with my process is pure white, but may be colored to any desired tint or shade. When fatliquored in the ordinary way, it can be made as soft, pliable and flexible as desired, or can be so treated as to be very firm and resistant to abrasion. It has a relatively high tensile strength and a marked resistance to tearing. Upon tearing, it shows an unusually long white fiber. When properly treated, it shows characteristics that make it desirable for glove leather. It possesses the unusual characteristic of being washable. Its properties can be varied over a very wide range for a great variety of uses. This leather contains upward of 0.5 part of P₂O₅ combined with 100 parts of hide substance. The P₂O₅ is combined with the hide substance in such manner as to resist removal by washing, as differentiated from P₂O₅ in other forms not in combination with the hide substance.

After tanning leather by the use of the previously described agents there will be present in the leather phosphates of three different types, (1) water-soluble uncombined phosphate, (2) water-insoluble uncombined phosphate, (3) phosphate chemically combined with the hide protein. The determination of the chemically combined phosphate should be made as follows:

A sample of the leather is washed in running water for 24 hours to remove all of the uncombined water-soluble phosphate. It is then subjected to the action of boiling nitric acid until completely oxidized and dissolved. This will require about three hours. A clear solution results. The solution is then evaporated nearly to dryness to drive off the excess nitric acid. The mixture is then dissolved in water and ammonia is added to make the water fairly alkaline. This causes a precipitation of the phosphate originally present in the leather as uncombined and water-insoluble. The phosphate left in the solution is that which was originally chemically combined with the hide protein. The mixture is filtered and the phosphate present in the filtrate is determined by the standard double precipitation method for determining phosphate, using ammonium molybdate and magnesium mixture.

An example of the amounts of P₂O₅ which may combine with the hide substance at various pH values is given in the foregoing Table I. The amount of P₂O₅ which combines with the hide substance may be varied as desired, but for most purposes there will be from about 0.5 to 8 parts or more per 100 parts of hide substance.

The amount of P₂O₅ combined may also be varied by using glassy materials of different Na₂O to P₂O₅ ratio at some desired pH. Table III shows the extent of combination of P₂O₅ for four glassy phosphates ranging in composition from a $$\frac{Na_2O}{P_2O_5}$$

ratio of 1:1 to a ratio of 1.50:1, the pH of the tanning liquor being 2.4. It is evident that the amount of combined P₂O₅ increases steadily as the ratio of Na₂O to P₂O₅ decreases to the 1:1 ratio of sodium metaphosphate.

Table III

| Ratio $\frac{Na_2O}{P_2O_5}$ | Grams P₂O₅ combined with 100 grams hide substance |
|---|---|
| 1.00 | 8.3 |
| 1.04 | 6.6 |
| 1.12 | 5.9 |
| 1.50 | 3.2 |

Although I have referred to the use of formaldehyde in the phosphate tanning liquor, I may use other aldehydes, for example, acetaldehyde or other aldehydes in place of the formaldehyde.

While I prefer to use the phosphates of sodium because of their cheapness, other alkali-metal soluble phosphates may be employed, such for example as the soluble phosphates of potassium or ammonium, or the corresponding acids in which one or more of the alkali-metal atoms are replaced by hydrogen atoms. Accordingly, in the claims the term "alkali-metal phosphate" is intended to include the corresponding acid.

I have given certain examples of the manner in which my invention may be carried out. Many variations in procedure may be made in order to make the product more suitable for special uses and the invention may be otherwise embodied or practiced within the scope of the following claims.

I claim:

1. A method of tanning animal skin, which comprises treating the skin with a solution containing as its essential tanning agent a compound of the formula $(M_2O)_x.(P_2O_5)_y$, in which M is hydrogen, ammonium and/or an alkali-metal, and in which the molar ratio of $M_2O$ to $P_2O_5$ is less than 2:1.

2. A method of tanning animal skin, which comprises treating the skin with an acid solution containing as its essential tanning agent a compound of the formula $(M_2O)_x.(P_2O_5)_y$, in which M is hydrogen, ammonium and/or an alkali-metal, and in which the molar ratio of $M_2O$ to $P_2O_5$ is less than 2:1.

3. A method of tanning animal skin, which comprises treating the skin with a solution containing as its essential tanning agent an alkali-metal salt of a phosphoric acid which is molecularly dehydrated to a greater extent than pyrophosphoric acid.

4. A method of tanning animal skin, which comprises treating the skin with a solution containing as its essential tanning agent a sodium salt of a phosphoric acid which is molecularly dehydrated to a greater extent than pyrophosphoric acid.

5. A method of tanning animal skin, which comprises treating the skin with a solution containing Graham's salt as its essential tanning agent.

6. A method of tanning animal skin, which comprises treating the skin with an acid solution containing Graham's salt as its essential tanning agent.

7. A method of tanning animal skin, which comprises treating the skin with a solution containing Graham's salt as its essential tanning agent, the solution being substantially free of other tanning agents.

8. A method of tanning animal skin, which comprises treating the skin with a solution containing Graham's salt and formaldehyde.

9. A method of tanning animal skin, which comprises treating the skin with an acid solution containing Graham's salt and formaldehyde.

10. A method of tanning animal skin, which comprises treating the skin with an acid solution of formaldehyde and Graham's salt, and after a sufficient period of tanning, making the solution alkaline and continuing the tanning.

11. A method of tanning animal skin, which comprises employing as the essential tanning agent a solution of a glassy material of the formula $(M_2O)_x.(P_2O_5)_y$, in which M is hydrogen, ammonium and/or an alkali-metal, and in which the molar ratio of $M_2O$ to $P_2O_5$ is less than 2:1.

12. A method of tanning animal skin, which comprises employing as the essential tanning agent an acid solution of a glassy material of the formula $(M_2O)_x.(P_2O_5)_y$, in which M is hydrogen, ammonium and/or an alkali-metal, and in which the molar ratio of $M_2O$ to $P_2O_5$ is less than 2:1.

13. A method of tanning animal skin, which comprises employing as the essential tanning agent a solution of the formula $H_3PO_4(HPO_3)_x$, in which $x$ is greater than 1.

14. A method of tanning animal skin, which comprises employing as the essential tanning agent a solution of a condensed phosphoric acid in which the ratio of $H_2O$ to $P_2O_5$ is less than 2:1.

15. A method of tanning animal skin, which comprises employing as the essential tanning agent a solution of the formula $(MPO_3)_x$, in which M represents an alkali-metal or ammonium and in which $x$ is greater than 3.

16. A method of tanning animal skin, which comprises treating the skin with a solution containing an aldehyde and a glassy material of the formula $(M_2O)_x.(P_2O_5)_y$, in which M is hydrogen, ammonium and/or an alkali-metal, and in which the molar ratio of $M_2O$ to $P_2O_5$ is less than 2:1.

17. A method of tanning animal skin, which comprises treating the skin with an acid solution containing an aldehyde and a glassy material of the formula $(M_2O)_x.(P_2O_5)_y$, in which M is hydrogen, ammonium and/or an alkali-metal, and in which the molar ratio of $M_2O$ to $P_2O_5$ is less than 2:1.

18. A tanning solution containing as its essential tanning agent a compound of the formula $(M_2O)_x.(P_2O_5)_y$, in which M is hydrogen, ammonium and/or an alkali-metal, and in which the molar ratio of $M_2O$ to $P_2O_5$ is less than 2:1.

19. An acid tanning solution containing as its essential tanning agent a compound of the formula $(M_2O)_x.(P_2O_5)_y$, in which M is hydrogen, ammonium and/or an alkali-metal, and in which the molar ratio of $M_2O$ to $P_2O_5$ is less than 2:1.

20. A tanning solution containing as its essential tanning agent an alkali-metal salt of a phosphoric acid which is molecularly dehydrated to a greater extent than pyrophosphoric acid.

21. A tanning solution containing as its essential tanning agent a sodium salt of a phosphoric acid which is molecularly dehydrated to a greater extent than pyrophosphoric acid.

22. A tanning liquor containing as its essential tanning agent a solution of a glassy material of the formula $(M_2O)_x.(P_2O_5)_y$, in which M is hydrogen, ammonium and/or an alkali-metal, and in which the molar ratio of $M_2O$ to $P_2O_5$ is less than 2:1.

23. A tanning solution containing Graham's salt as its essential tanning agent.

24. A strongly acid tanning solution containing Graham's salt as its essential tanning agent.

25. A tanning solution containing formaldehyde and Graham's salt.

26. A tanning liquor containing as its essential tanning agent a solution of a glassy material of the formula $(M_2O)_x.(P_2O_5)_y$, in which M is hydrogen, ammonium and/or an alkali-metal, and in which the molar ratio of $M_2O$ to $P_2O_5$ is less than 2:1.

27. A tanning liquor containing as its essential tanning agent a solution of the formula $H_3PO_4(HPO_3)_x$, in which $x$ is greater than 1.

28. A tanning liquor containing as its essential tanning agent a solution of a condensed phosphoric acid in which the ratio of $H_2O$ to $P_2O_5$ is less than 2:1.

29. A tanning liquor containing as its essential tanning agent a solution of the formula $(MPO_3)_x$, in which M represents an alkali-metal or ammonium and in which $x$ is greater than 3.

30. An acid tanning liquor containing as its essential tanning agent a solution of a glassy material of the formula $(M_2O)_x.(P_2O_5)_y$, in which M is hydrogen, ammonium and/or an alkali-metal, and in which the molar ratio of $M_2O$ to $P_2O_5$ is less than 2:1.

31. A tanning liquor containing an aldehyde and a solution of a glassy material of the formula $(M_2O)_x.(P_2O_5)_y$, in which M is hydrogen, ammonium and/or an alkali-metal, and in which the molar ratio of $M_2O$ to $P_2O_5$ is less than 2:1.

32. A method of tanning animal skin, which comprises treating the skin with a solution containing an aldehyde and a compound of the formula $(M_2O)_x.(P_2O_5)_y$, in which M is hydrogen, ammonium and/or an alkali-metal, and in which the molar ratio of $M_2O$ to $P_2O_5$ is less than 2:1.

33. A method of tanning animal skin, which comprises employing as the essential tanning agent a solution of an alkali-metal trimetaphosphate.

34. A tanning liquor containing an alkali-metal trimetaphosphate as its essential tanning agent.

35. A method of tanning animal skin, which comprises treating the skin with an acid solution containing as its essential tanning agent a compound of the formula $(M_2O)_x.(P_2O_5)_y$, in which M is hydrogen, ammonium and/or an alkali-metal, and in which the molar ratio of $M_2O$ to $P_2O_5$ is less than 2:1, the pH value of the solution being approximately at the point where the hide protein acquires a maximum positive electrical charge.

36. A method of tanning animal skin, which comprises treating the skin with an acid solution containing as its essential tanning agent a compound of the formula $(M_2O)_x.(P_2O_5)_y$, in which M is hydrogen, ammonium and/or an alkali-metal, and in which the molar ratio of $M_2O$ to $P_2O_5$ is less than 2:1, the pH value of the solution being approximately 2.4.

37. A method of tanning animal skin, which comprises treating the skin with an acid solution containing as its essential tanning agent a compound of the formula $(M_2O)_x.(P_2O_5)_y$, in which M is hydrogen, ammonium and/or an alkali-metal, and in which the molar ratio of $M_2O$ to $P_2O_5$ is less than 2:1, the pH value of the solution being between approximately 2 and 4.

38. Leather containing more than one part $P_2O_5$ chemically combined with one hundred parts of hide substance.

39. Leather containing more than one part $P_2O_5$ chemically combined with one hundred parts of hide substance, the combined $P_2O_5$ being substantially free from metallic tanning agents.

40. Leather containing more than one part $P_2O_5$ chemically combined with one hundred parts of hide substance, the combined $P_2O_5$ being substantially free from other tanning agents.

41. Leather containing more than one part $P_2O_5$ chemically combined with one hundred parts of hide substance, the leather being substantially free from other tanning agents.

42. Leather tanned in a solution having a pH value between about 2 and 4 and containing as its essential tanning agent a compound of the formula $(M_2O)_x.(P_2O_5)_y$, in which M is hydrogen, ammonium and/or an alkali metal, and in which the molar ratio of $M_2O$ to $P_2O_5$ is less than 2:1, the leather containing more than one part $P_2O_5$ chemically combined with one hundred parts of hide substance, the leather being characterized by high tensile strength, high resistance to abrasion, long fibre and by being washable without unduly affecting its physical properties.

43. White leather, which is white entirely through its thickness and substantially free from white filling pigment, the leather having been tanned in a solution having a pH value between about 2 and 4 and containing as its essential tanning agent a compound of the formula $(M_2O)_x.(P_2O_5)_y$, in which M is hydrogen, ammonium and/or an alkali-metal, and in which the molar ratio of $M_2O$ to $P_2O_5$ is less than 2:1, the leather containing more than one part $P_2O_5$ chemically combined with one hundred parts of hide substance, the leather being characterized by high tensile strength, high resistance to abrasion, long fibre and by being washable without unduly affecting its physical properties or color.

JOHN ARTHUR WILSON.